Sept. 20, 1971      L. M. RIDGELY      3,606,441
HOIST HOOK DEVICE
Filed Nov. 12, 1969
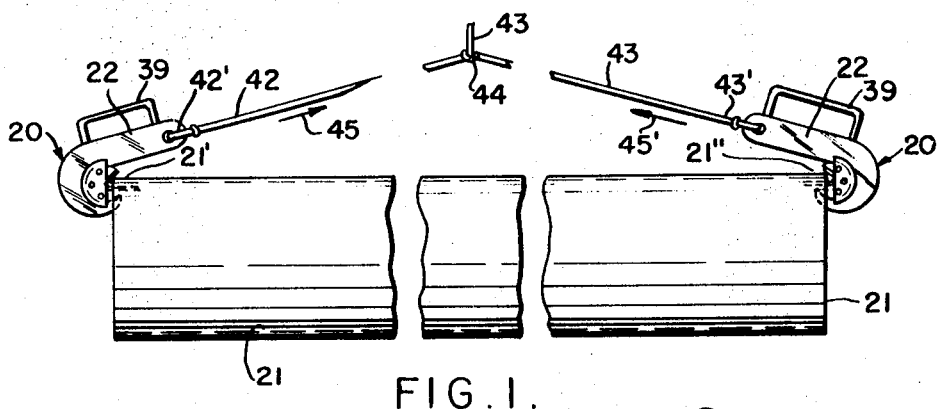
FIG.1.
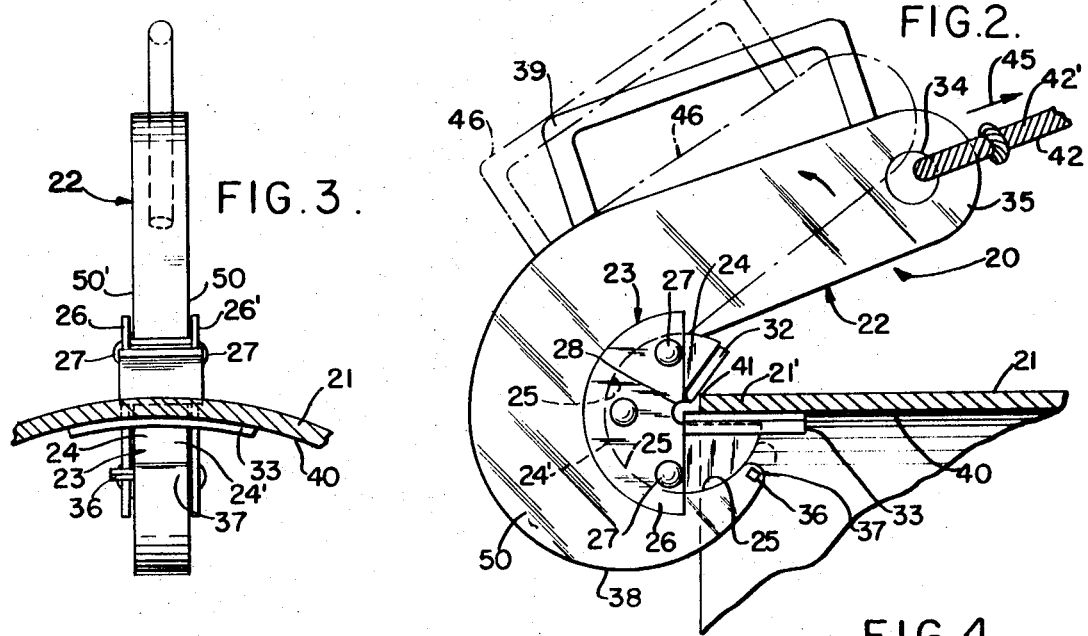
FIG.3.      FIG.2.      FIG.4.
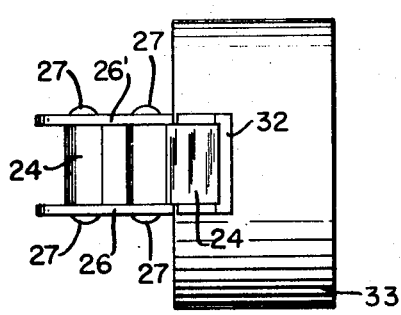
FIG.6.
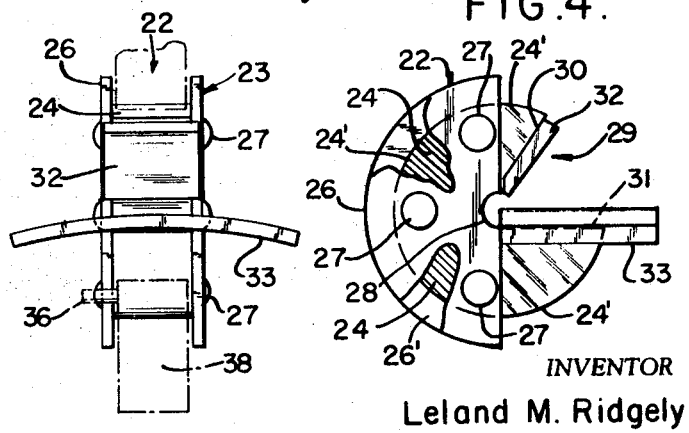
FIG.5.
INVENTOR
Leland M. Ridgely
ATTORNEY 3,606,441
HOIST HOOK DEVICE
Leland M. Ridgely, 1711 Jacquelyn 21,
Houston, Tex. 77055
Filed Nov. 12, 1969, Ser. No. 875,678
Int. Cl. B66c 1/34
U.S. Cl. 294—78R      4 Claims

ABSTRACT OF THE DISCLOSURE

The invention comprises a J-shaped hoist hook. The hook has a cylinder mounted in the apex of the hook, with the hook being rotatable relative to cylinder. The cylinder has a radial cut out to receive the outer edge of a cylindrical pipe, a curved plate is fixed to the cylinder along an edge of the radial cut out for engaging and supporting the underside of the edge of the pipe. The hook can rotate relative to the cylinder and pipe to adjust to different angles when lifting the pipe.

---

This invention relates to hoist hooks, more particularly the invention relates to hooks for lifting curved objects.

It is an object of the invention to provide a novel hoist hook for hoisting pipe which has a cylinder with a radial cut out to receive and engage the edges of a curved object such as a pipe, with the hook being rotatably mounted to the cylinder to adjust to different angles when lifting the curved object.

It is a further object of the invention to provided a novel hook for hoisting objects which has a rotary means for engaging the edges of the object, with a hook rotatably mounted to the cylinder to adjust to different angles to prevent damage to the edges of the object as it is being hoisted by the hook.

Further objects and advantages of the invention will become apparent as the description proceeds and when taken in conjunction with the accompanying drawing wherein:

FIG. 1 is a side-elevational view of the hoist hook inventions being used together to hoist a cylindrical pipe.

FIG. 2 is an enlarged side-elevational view of the pipe hoisting hook invention.

FIG. 3 is an enlarged front elevational view of the hoist hook invention.

FIG. 4 is a further enlarged side-elevational view of the rotary cylinder portion of the hoist hook invention.

FIG. 5 is a further enlarged front elevational view of the rotary cylinder.

FIG. 6 is a further enlarged top plan view of the rotary cylinder.

Briefly stated, the invention comprises a hoist hook device which has a J-shaped hook with a cylinder mounted in the apex of the hook and with the hook being rotatable relative to the cylinder, the cylinder having a radial cut out to receive the outer edge of a curved pipe, a curved plate is fixed to the cylinder along one radial edge of the radial cut out and acts to engage the underside of the edge of the pipe for the pipe to rest on, said cylinder has a flat plate fixed along the other radial edge of the radial cut out and acts to engage the upper outer edge of the pipe to wedge the edge of the pipe therebetween, with the J-shaped hook being rotatable relative to the cylinder and pipe when the hook is lifted by a cable to adjust the hook to different angles relative to the pipe to prevent damage to the outer edge of the pipe.

Referring more particularly to the drawing in FIG. 1, a pair of hoist hook inventions 20 are illustrated attached to opposite edges 21' and 21" of a cylindrical pipe 21.

Each hoist hook invention 20 as illustrated in FIGS. 1 and 2, have a J-shaped hoist hook portion 22, and a rotary cylindrical pipe engaging member 23. The pipe engaging member 23 has a cylindrical member 24, with the cylinder 24 having a cylindrical outer surface 24' which is rotatably received in the cylindrical cut out area 25 of the hook so that the hook 22 may rotate relative to the cylinder 24, along their cylindrical surfaces.

The cylinder 24 has a pair of half moon flanges 26 and 26' fixed on opposite sides of the cylinder 24, the flanges being fixed to the opposite sides of the cylinder 24 by three rivets 27 on each side. The flanges 26 and 26' slidably engage the opposing outer faces 50 and 50' of the hook portion 22 and act as guideways to maintain the cylinder 24 in the cylindrical cut out area 25 of the hook 22 while the hook 22 rotates relative to the cylinder 24.

The cylinder 24 and half moon flanges 26 and 26' have a center bore 28, and the cylinder 24 has a pie-shaped radial cut out area 29 extending radially outward from the bore in an opposite direction from the half flanges with an upper radial edge 30 and a lower radial edge 31. A relatively flat short plate 32 is welded to the upper radial edge 30, and a curved substantially larger plate 33 is welded to the lower radial edge 31 and projects laterally outward on opposite sides of the cylinder 24.

The hook 22 has a bore 34 along its rearward end portion 35 and has a lateral pin 36 fixed to the nose 37 of the hooked end 38 of the hook, which pin 36 projects laterally outward and is engaged by the flange 26 to limit the clockwise movement of the hook 22 relative to the rotary engaging member 23, when viewed from FIG. 2.

A rectangular handle 39 is welded to the top of the main leg of the hook for carrying the hook while attaching it to the pipe.

OPERATION

The hoist hook invention 20 operates as follows: A pair of the hoist hook inventions 20 are each attached to opposite edges 21' and 21" of the pipe 21, as illustrated in FIGS. 1 and 2, in the same manner.

The edge 21', for example, is received into the radial cut out area 29 of the cylinder 24 with the cylindrical underside 40 of the pipe 21 resting on the curved plate 33 of the cylinder, and with the top outer corner 41 of the pipe engaged against the flat plate 32 of the cylinder.

One cable 42 has one end 42' attached to the hook portion 22 of one of the hook inventions 20 by looping the end 42' through the bore 34 and tying. The other main cable 43 has one end 43' attached to the hook portion 22 of the other hook invention 20 by passing the end 43' through the bore 34 and tying it in a conventional manner. The other end 42" of the one cable is tied to the other cable 43 at an intermediate location 44. The other end 43" of the main cable 43 extends upward to a hoisting mechanism for raising and lowering the cables 42 and 43 and thereby raising and lowering the pair of hoist hook inventions 20 and the pipe 21.

When the cable hoist hooks and pipe are lifted the pair of hoist hook inventions 20 are drawn toward one another by the attachment of the end 42" of the cable to the main cable 43 at the intermediate location, as illustrated by the arrows designated by the numerals 45 and 45', causing the ends 21' and 21" to wedge between the plates 32 and 33 as illustrated in FIG. 2, so that the cylinder 23 will not move relative to the pipe 21, while lifting.

While the cylinders 23 of the hoist hook inventions 20 will not move while the pipe is being hoisted upward by the cables 42 and 43, the hook portions 22 of each of the hook inventions are free to rotate or pivot relative to their cylinder 23, to adjust for taking up the slack in the cables.

In FIG. 2, the pivotal or rotational movement of the hook portion 22 relative to the cylinder to adjust for taking up the slack is illustrated, for example, by the phantom lines 46, which shows the hook portion 22 having pivoted counter-clockwise a short distance.

Thus by the hook portions 22 being able to rotate relative to the cylinders, this prevents damage to the edges of the pipe 21, when taking up the slack and lifting the pipe 21 by the cables.

Thus it will be seen that a novel hoist hook invention has been provided which has a novel cylinder engaging member for engaging and wedging against the edges of the pipe, with a hook portion, to which the cable for lifting is attached, which is rotatable relative to the cylinder to adjust for taking up the slack when lifting the pipe.

It will be obvious that various changes and departures may be made to the invention without departing from the spirit thereof and accordingly it is not intended that the invention be limited to that specifically described in the specification or as illustrated in the drawing, but only as set forth in the appended claims wherein what is claimed is:

1. A hoist hook device having a J-shaped hook portion, a cylinder rotatably mounted in the apex of the hook portion, said cylinder having a cut out area for receiving the edges of a pipe with the hook portion being rotatable relative to the cylinder and relative to the pipe to adjust for any movement of the hook portion relative to the pipe, to prevent damage to the edges of the pipe.

2. A hoist hook device according to claim 1 wherein a pair of half moon flanges are fixed to opposite sides of the cylinder to maintain the cylinder in the apex of the hook portion.

3. A hoist hook device according to claim 1 wherein said cylinder has radial edges in the cut out area which radiate outward from one another and said cylinder has a curved plate extending laterally across the cylinder in the cut out area of the cylinder along one of the radial edges of the cylinder and fixed thereto, said curved plate acting to engage the underside of the edge of the pipe for the pipe to rest on.

4. A hoist hook device according to claim 3 wherein said device has a flat plate fixed to the other of said radial edges of the cylinder in the cut out area, opposite the curved plate which extends along the one radial edge of the cylinder, said flat plate acting to engage the outer upper edge of the pipe.

References Cited

UNITED STATES PATENTS 1,591,248  7/1926  Tracy _____ 294—78A
2,821,318  1/1958  Kendall _____ 294—866S RICHARD E. AEGERTER, Primary Examiner D. D. WATTS, Assistant Examiner U.S. Cl. X.R.

214—1PA; 294—74, Dig. 1